United States Patent
Whitehead

(10) Patent No.: US 8,611,011 B2
(45) Date of Patent: Dec. 17, 2013

(54) DUAL-STAGE SUNLIGHT REDIRECTION SYSTEM

(75) Inventor: Lorne Whitehead, Vancouver (CA)

(73) Assignee: SunCentral, Inc. (CA)

( * ) Notice: Subject to any disclaimer, the term of this patent is extended or adjusted under 35 U.S.C. 154(b) by 0 days.

(21) Appl. No.: 13/487,679

(22) Filed: Jun. 4, 2012

(65) Prior Publication Data
US 2013/0279008 A1     Oct. 24, 2013

Related U.S. Application Data

(60) Provisional application No. 61/636,422, filed on Apr. 20, 2012.

(51) Int. Cl.
  *G02B 5/08*   (2006.01)
  *E06B 7/28*   (2006.01)
  *F21V 7/00*   (2006.01)

(52) U.S. Cl.
  USPC ............. 359/591; 52/173.1; 52/200; 359/597

(58) Field of Classification Search
  USPC .................................... 52/200; 359/591–598
  See application file for complete search history.

(56) References Cited

U.S. PATENT DOCUMENTS

| | | | |
|---|---|---|---|
| 717,783 A | | 1/1903 | Wadsworth |
| 729,660 A | | 6/1903 | Poulson |
| 1,567,984 A | * | 12/1925 | Reid .............................. 359/597 |
| 2,022,144 A | * | 11/1935 | Nicolson ........................... 353/3 |
| 5,295,051 A | * | 3/1994 | Cowling ........................ 362/576 |
| 5,980,052 A | * | 11/1999 | Thor et al. ..................... 359/877 |
| 8,027,092 B1 | * | 9/2011 | Huff et al. ..................... 359/591 |
| 8,491,138 B2 | * | 7/2013 | O .................................. 359/855 |
| 2005/0128728 A1 | | 6/2005 | Eisenman et al. |
| 2006/0013001 A1 | * | 1/2006 | Roth .............................. 362/296 |

(Continued)

FOREIGN PATENT DOCUMENTS

| | | |
|---|---|---|
| WO | 2011/012301 | 2/2011 |
| WO | 2012/051095 | 4/2012 |
| WO | 2013/059908 | 5/2013 |
| WO | 2013/093796 | 6/2013 |

OTHER PUBLICATIONS

Entech Solar, "Entech Collimating Skylight—Economical daylighting technology that double the amount of light where you want it", Entech Solar, Inc., 2011.

(Continued)

*Primary Examiner* — Clayton E Laballe
*Assistant Examiner* — Kevin Butler
(74) *Attorney, Agent, or Firm* — Fish & Associates, PC

(57) ABSTRACT

A system providing consistent and intense sunlight to light-guiding structures for redirecting sunlight to the interior of a building is presented. One aspect of the inventive subject matter includes an illumination system comprising a solar redirector and at least one optical converter. The solar redirector can be configured to extend outward from a wall of a building and to redirect sunlight to exterior sections of the wall below the solar redirector. The optical converter can be configured to mount on at least one of the exterior sections of the wall and to receive the redirected sunlight and distribute the redirected sunlight to an interior of the building.

25 Claims, 3 Drawing Sheets

(56) References Cited

U.S. PATENT DOCUMENTS

| | | | |
|---|---|---|---|
| 2008/0202703 A1* | 8/2008 | Edmonds | 160/168.1 R |
| 2010/0254010 A1* | 10/2010 | Whitehead et al. | 359/597 |
| 2010/0300510 A1* | 12/2010 | Goldman et al. | 136/246 |
| 2011/0272002 A1* | 11/2011 | Liu | 136/246 |
| 2012/0011782 A1* | 1/2012 | Kolas et al. | 52/173.3 |
| 2013/0084040 A1 | 4/2013 | Scott et al. | |
| 2013/0188261 A1* | 7/2013 | Mosher | 359/640 |

OTHER PUBLICATIONS

International Energy Agency, "Daylight in Buildings—ECBCS Annex 29 /SHC Task 21 Project Summary Report", AECOM Ltd, 2010.

Sun Dolier, "Core Daylighling", http://www.sundoliercom/index.php/products/product-diagram/coredaylighting.

* cited by examiner

DUAL-STAGE SUNLIGHT REDIRECTION SYSTEM

This application claims the benefit of U.S. provisional application No. 61/636,422, filed Apr. 20, 2012, incorporated herein by reference in its entirety.

FIELD OF THE INVENTION

The field of the invention is light distribution technologies.

BACKGROUND

As the demand for green technologies grows, the demand for increasingly efficient light sources has also increased as evidenced by the migration from incandescent light bulbs, to compact fluorescent light bulbs, and now on to Light Emitting Diode light bulbs. While these newly developed light bulbs are more efficient relative to the traditional incandescent light bulbs, they may be far less efficient or more costly than using available sunlight. Thus, different ways of gathering and redirecting sunlight to illuminate the interior of a building have been developed. Consider the following examples:

"Project Summary Report—Daylight in Buildings", published by the International Energy Agency in 2010;

U.S. patent publication 2010/0254010 to Whitehead et al. titled "Adaptive Sunlight Redirector", filed Jun. 16, 2008;

U.S. patent publication 2012/0011782 to Kolas et al. titled "Fenestration System with Solar Cells", filed Sep. 28, 2011;

U.S. Pat. No. 8,027,092 to Huff et al. titled "Curved Light Shelf System for Daylighting an Interior Space", filed Jan. 21, 2011;

U.S. patent publication 2005/0128728 to Eisenman et al. titled "Light Tube System for Distributing Sunlight or Artificial Light Singly or in Combination", filed Jan. 7, 2005;

U.S. patent publication 2011/0272002 to Liu titled "Sunlight Collecting System for Illumination", filed May 3, 2011; and U.S. patent publication 2006/0013001 to Roth titled "Reflectors for Condensed Light Beam Distribution", filed Jul. 5, 2005.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

While these and other known references allow redirection of available sunlight from a location (e.g., a window, a roof, etc.) to illuminate the interior of a building, they all exhibit certain limitations. For instance, the locations on which the light collecting/harvesting structures can be mounted are limited to those that receive abundant sunlight (e.g., the roof, the side(s) of the building that faces the sun) throughout the day. Furthermore, the usefulness of the available sunlight received by light collecting/harvesting structures, in terms of its ability to be efficiently introduced into and guided by the light guiding structure, varies throughout the day as the sunlight comes from different directions at different times of the day. As such, there is a need to improve on the existing systems by maximizing the amount of sunlight received by the light guiding structures independent of the locations on which they are mounted.

SUMMARY OF THE INVENTION

The inventive subject matter provides apparatus, systems and methods in which more consistent sunlight is provided to light guiding structures for redirecting sunlight to the interior of a building. One aspect of the inventive subject matter includes an illumination system comprising a remote solar redirector and at least one optical converter. The remote solar redirector is configured to extend outward from a wall of a building and to redirect sunlight to exterior sections of the wall below the remote solar redirector. The optical converter is configured to mount on at least one of the exterior sections of the wall and to receive the redirected sunlight and distribute the redirected sunlight to an interior of the building.

In some embodiments, the optical converter is configured to mount on an exterior section of the wall that is positioned below the solar redirector. In addition, the optical converter of some embodiments is also configured to guide the received sunlight into a light guiding structure of the building. Therefore, in some of these embodiments, the optical converter is further configured to concentrate and then re-collimate the redirected sunlight to have an appropriate collimation angle before redirecting the beam of light into the light guiding structure.

In some embodiments, the remote solar redirector is further configured to concentrate and recollimate the sunlight into a beam of light before directing the beam of light to hit the wall at a fixed angle. In some of these embodiments, the beam of light is directed to hit the wall at a grazing incidence. In more preferable embodiments, the beam of light is directed to hit the wall at an angle of incidence (the angle from the normal or perpendicular direction of the wall) that is larger than seventy-five degrees.

In some embodiments, the solar redirector includes a canopy. The solar redirector of some embodiments includes a rotary venetian assembly. In some of these embodiments, the rotary venetian assembly includes an array of movable light redirecting components. In some embodiments, the array of movable light redirecting components includes at least one component with light reflecting property (e.g., a mirror) or a component with light refracting property (e.g., a lens).

The solar redirector of some embodiments is further configured to extend approximately at a right angle (i.e., approximately orthogonal) to the wall. In some of these embodiments, the solar redirector is also configured to adjust its angle with respect to the wall. The solar redirector of some embodiments is configured to mount on a perimeter of a roof of the building. In some embodiments, the illumination system includes several solar redirectors that are mounted on the perimeter of the roof and several optical converters. Preferably but not necessarily, the solar redirectors complete the perimeter of the roof. In some embodiments, at least one of the solar redirectors is configured to redirect sunlight to a side of the building that does not otherwise receive direct sunlight.

As mentioned, the solar redirector is configured to extend outward from the wall for a certain distance (e.g., a width of the solar redirector). In some preferred embodiments, the solar redirector is further configured to redirect the sunlight to travel a distance that is at least twice the width of the solar redirector before hitting the exterior sections of the wall or before reaching a target optical converter. In some embodiments, the sunlight is redirected by the solar redirector to travel through an exterior space adjacent to the wall of the building. In some of these embodiments, such exterior space is an open unenclosed space. Additionally or alternatively, the sunlight is also redirected by the solar redirector to travel through an enclosed or unenclosed atrium or courtyard of the building.

It should be noted that the term "wall" is used throughout this description to euphemistically describe a portion of a building that includes, but not limited to, ornaments, windows, windowsills, balconies, ledges, facades, etc., and that separates the predominantly occupied space of the building from the exterior, an atrium or, or a courtyard.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

According to some aspects of the present invention, an illumination system that includes a remote solar redirector and an optical converter is presented. Specifically, the solar redirector is configured to extend outward from a wall of a building. The solar redirector is also configured to redirect the sunlight to exterior sections of the wall below the solar redirector. The optical converter is configured to mount on at least one of the exterior sections of the wall and to receive the redirected sunlight and distribute the redirected sunlight to an interior of the building.

Preferably, the solar redirector is mounted at a location of a building that is high enough such that it receives abundant amount of sunlight throughout the day. For example, in a dense urban area, the solar redirector is preferably mounted on the roof of a building in order to avoid obstruction from neighbor buildings. However, in other less dense areas, the solar redirector can be mounted in other areas of the building's wall as long as it is able to receive sunlight throughout the day.

One should appreciate that the disclosed techniques provide many advantageous technical effects. For example, the inclusion of the solar redirector in an illumination system allows consistent sunlight to be reached throughout the building in most times of the day, including the building's regions which would not be accessible for sunlight illumination by conventional daylighting techniques.

Figure 1:
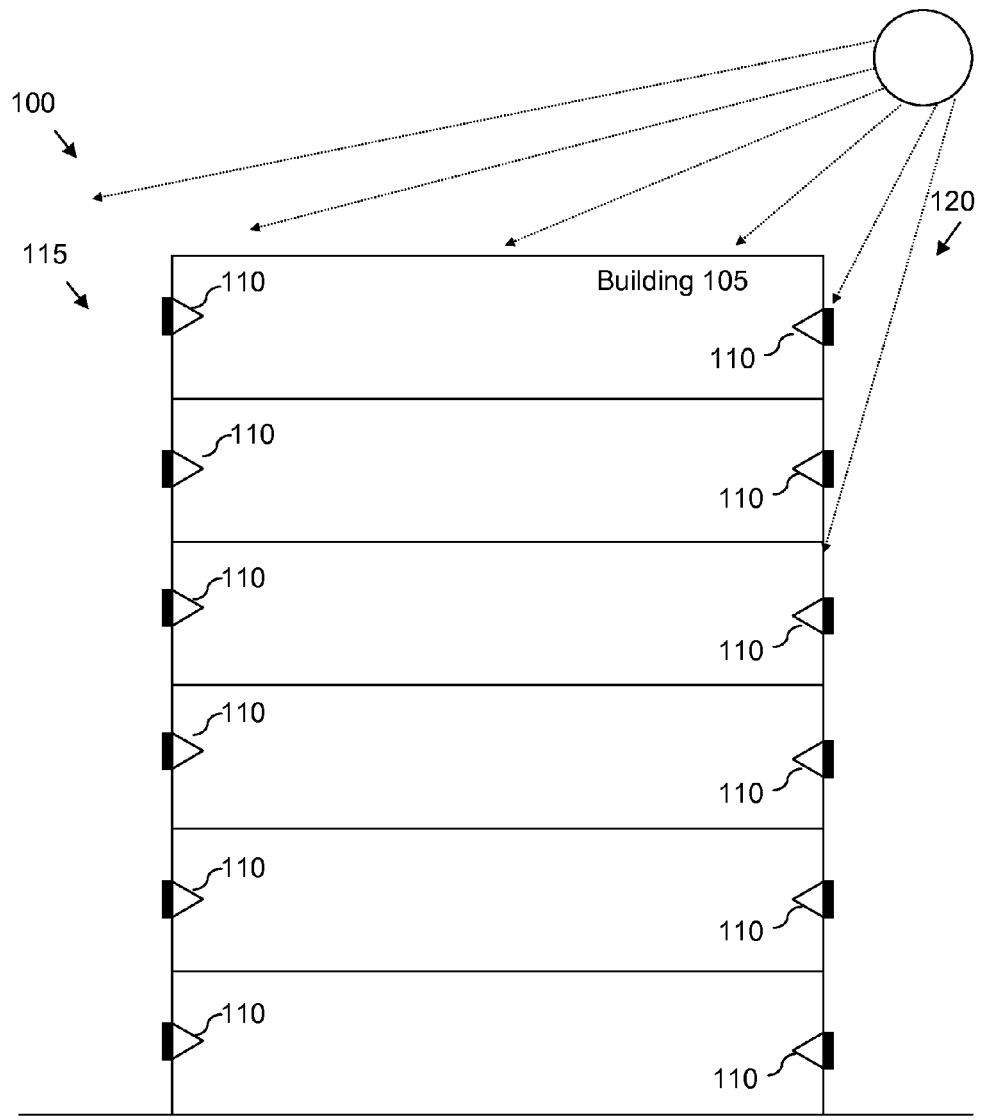
FIG. 1 illustrates an example illumination system of some embodiments.

FIG. 1 illustrates an example illumination system 100 of some embodiments. Specifically, FIG. 1 illustrates a side view of a building 105. As shown, the building 105 is a six-story building. On each story, several façade mounted units 110 are installed on different sides of the building 105. For example, the figure shows that a façade mounted unit 110 is installed on each story of side 115 of the building 105, and a façade mounted unit 110 is installed on each story of side 120 of the building 105. In this example, each façade mounted unit 110 includes a solar redirector and a optical converter. The solar redirector redirects the sunlight to the optical converter. The optical converter then concentrates and recollimates the redirected sunlight into a beam of light, and then directs the beam of light to a set of light guiding structures located inside the building (not shown). One skilled in the art would appreciate that the building 105 includes more than two sides and additional façade mounted units are installed on each story for the other sides of the building 105 as well. One should further appreciate that the example building presented in FIG. 1 is merely an example of a structure. Other structures that could benefit from the disclosed subject matter can include temporary structures (e.g., tents, canopies, etc.), trailers, vehicles, RVs, shipping containers used as a temporary buildings, stadiums, homes, shopping centers, or other types of structures.

The façade mounted units 110 may be mounted on a wall of a building. It should be noted that the term "wall" is used throughout this description to euphemistically describe a portion of a building that includes, but not limited to the ornaments, windows, windowsills, balconies, ledges, etc., and that separates the predominantly occupied space of the building from the exterior, an atrium or, or a courtyard.

In a preferred embodiment, that portion of the wall is adjacent to a space with vertical clearings such that the portion is reachable by suitably re-directed sunlight. Each façade mounted unit 110 receives sunlight at their respective locations and guides the light to inside the building 105 to illuminate the interior of the building 105. In some embodiments, each façade mounted unit 110 is connected to other light guiding devices or waveguides (not shown) for transporting the light to other sections of the building 105.

One deficiency of the illumination system 100 is that the efficiency of each façade mounted unit 110 depends on the amount of sunlight that is available at their respective locations. For example, when the sun is located above side 120 of the building 105, as shown in FIG. 1, the façade mounted units 110 on side 120 of the building 105 operate at high efficiency as large amounts of sunlight can be received by those façade mounted units 110 on the side 120. On the other hand, the façade mounted units 110 that are located on side 115 of the building 105 operate at a much lower efficiency level since no direct sunlight is available on the side 115 of the building 105. In addition to the locations of the sun, the efficiency of the façade mounted units 110 also depends on other factors such as locations of the façade mounted units 110 and locations of neighboring structures. For example, in dense urban areas, there is usually more sunlight available on higher stories of the building 105 than lower stories so façade mounted units that are located at higher stories operate at higher efficiency levels than façade mounted units that are located at lower stories. Also, neighboring structures may block at least a portion of the sunlight available to a section of the building 105 causing façade mounted units at that section of the building 105 to operate at low efficiency levels.

Figure 2:
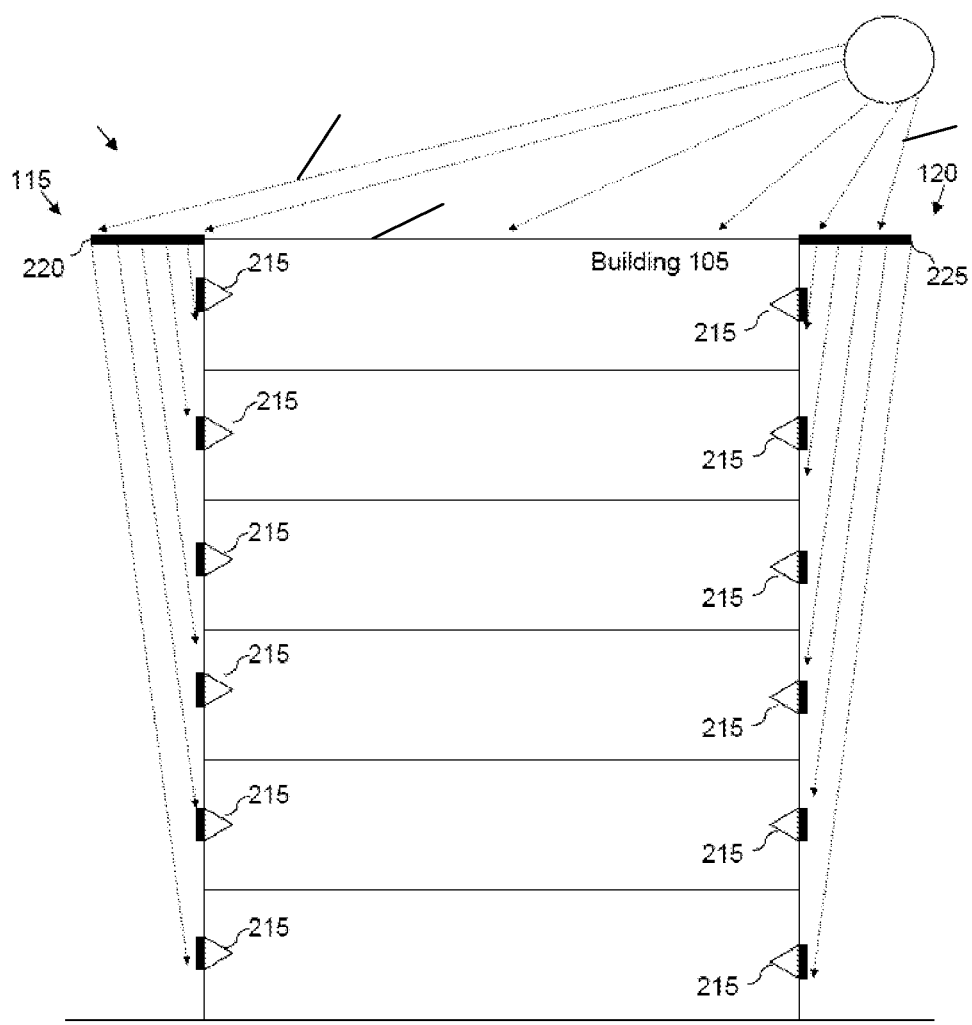
FIG. 2 illustrates another example illumination system of some embodiments.

FIG. 2 illustrates another example illumination system 200 of some embodiments that includes a remote solar redirector that is physically separated (or physically decoupled) from an optical converter. Specifically, FIG. 2 shows the illumination system 200 being implemented in the same building 105 of FIG. 1. Unlike the building 105 in FIG. 1, only optical converters 215 are installed on each story of the building 105. Specifically, for each story, one optical converter 215 is shown to be installed on the side 115 and one optical converter 215 is shown to be installed on the side 120 of the building 105. One skilled in the art would appreciate that the building 105 includes more than two sides and additional optical converters are installed on other sides of the building 105 as well. In addition, although the building 105 is shown to have six stories, one skilled in the art would appreciate that the illumination system 200 can be implemented on a building with different heights and different number of stories.

In addition to the optical converters, the illumination system 200 also includes remote solar redirectors 220 and 225 that are separated from the optical converters 215. In some embodiments, the remote solar redirectors 220 and 225 are configured to extend outward from an exterior wall of a building and to redirect sunlight to exterior sections of the wall below the solar redirectors. Preferably, the solar redirectors are configured to be mounted at a location of the building that is high enough to receive desirable, preferably maximum, amounts of sunlight. Even more preferably, the solar directors are configured to be mounted at the highest point of the building (e.g., the edge of the roof). In this example, the remote solar redirectors 220 and 225 are mounted adjacent to the roof 230 of the building 105 and extended outward from the walls by a certain width. Specifically, the remote solar redirector 220 is mounted on the side 115 and the remote solar redirector 225 is mounted on the side 220 of the roof 230 of the building. The remote solar redirector 220 collects sunlight and redirects the sunlight to the exterior sections of the wall located on the side 115 of the building 105 below the remote solar redirector 220, while the remote solar redirector 225 collects sunlight and redirects the sunlight to the exterior sections of the wall located on the side 120 of the building 105 below the remote solar redirector 225.

The separation of the solar redirectors and the optical converters in the illumination system 200 offers several advantages over the illumination system 100. For example, the solar redirectors 220 and 225 allow more consistent sunlight to reach the optical converters 215 that are mounted on different sides (including but not limited to the sides 115 and 120) and different stories of the building 105. This way, all optical converters 215 that are installed on the building can operate at high efficiency levels regardless of their locations and other obstructions (e.g., neighboring building structures). In some embodiments, at least one of the solar redirectors is configured to redirect sunlight to an exterior section of the building that does not otherwise receive direct sunlight.

FIG. 2 also illustrates that the solar redirector of some embodiments concentrates and recollimates the sunlight to form a beam of light before redirecting the sunlight to the wall. As shown, the solar redirectors 220 and 225 collimate the collected sunlight to form beams of light 235 and 240 that are directed to the exterior sections of the wall. It should be noted that the term "beam" is used euphemistically to mean a directed aggregation of light having high intensity. In addition, beams can be approximately one dimensional (i.e., a line), two dimensional (e.g., sheet or plane), or even three dimensional (e.g., a column).

Collimation of the sunlight provides many benefits to the illumination system 200. For example, it allows the sunlight to stay in the intended direction and/or route with no (or very little) deviation without using additional light guiding devices. As a result, no (or very little) sunlight is lost before hitting the wall of the building 105. It is contemplated that the solar redirector of some embodiments is configured to redirect the sunlight to travel in an open unenclosed space without additional light guiding devices before the beam hits the exterior sections of the wall. As shown in FIG. 2, the sunlight is redirected by the solar redirector to travel in an open unenclosed space that is outside of the building 105.

Although the solar redirectors 220 and 225 are shown to be mounted adjacent to an exterior wall of the building 105, the solar redirector of some embodiments is configured to mount on a wall or a roof adjacent to an atrium of the building (an open area within the building where the roof is uncovered, or covered by a material that allows light to transmit) and extend outward from the wall of the atrium. In these embodiments, the optical converters are configured to mount on the wall adjacent to the atrium below the solar redirector, and the beam of sunlight is redirected by the solar redirector to travel through the open space of the atrium before reaching the optical converters.

In some embodiments, the solar redirector is configured to redirect the sunlight to travel a distance that is at least twice the width of the solar redirector (i.e., the dimension of the solar redirector that extends outward from the wall) in an open unenclosed space before hitting the exterior sections of the wall without additional light guiding devices.

FIG. 2 illustrates that the sunlight beams 235 and 240 that are redirected by the solar redirectors 220 and 225 hit the exterior sections of the wall at a fixed angle. Preferably, the solar redirector is configured to redirect the sunlight to reach all exterior sections of the building wall. Thus, the angle at which the sunlight beams hit the exterior sections of the wall depends on the height of the portion of the building that is illuminated by the redirector and the width of the solar redirector that is extended out from the wall. In other words, the taller the building causes the beam of light to hit the wall at a more acute angle (i.e., larger angle of incidence). Similarly, the smaller the width of the solar redirector also causes the beam of light to hit the wall at a more acute angle (i.e., larger angle of incidence). In some embodiments, the solar redirectors 220 and 225 are configured to redirect the beams of light to hit the walls at a grazing incidence. In more preferable embodiments, the beams of light are directed to hit the walls at an angle of incidence that is larger than seventy-five degrees.

In some embodiments, the solar redirector of the illumination system 200 includes a canopy that extends outward from a wall to create a large surface area for collecting sunlight. The canopy of some embodiments includes a set of components for collecting, redirecting, and/or collimating sunlight. An example of such a component is a rotary venetian assembly, described in U.S. Provisional Patent Application 61/551, 050 titled "Sunlight Redirecting Mirror Arrays (Rotary Venetian)", filed Oct. 25, 2011, which is incorporated herein by reference in its entirety. In some of these embodiments, the rotary venetian assembly includes an array of movable light redirecting components for redirecting and/or collimating of sunlight. In some embodiments, the array of movable light redirecting components includes at least one component with light reflecting property (e.g., a mirror) or a component with light refracting property (e.g., a lens).

Although the solar redirector as shown in FIG. 2 is mounted approximately at a right angle to the exterior wall of a building, other embodiments mount the solar redirectors at different angles with respect to the exterior wall of the building for different reasons. For example, the solar redirector can be angled to make it easier for the internal optics to redirect the sunlight, to facilitate the shedding of rain and snow, to be more architecturally appealing for a particular building design, to reduce cost and increase structural stability, etc.

In addition, the solar redirector of some embodiments is also configured to adjust its angle with respect to the wall and to adjust its angle with respect to an axis perpendicular to the wall. For example, the angles of the solar redirector can be adjusted (independent of or in addition to adjusting the movable optics elements of the solar redirector) to receive maximum sunlight throughout the day. In some embodiments, the solar redirector is configured to adjust its angles at different times of the day such that the flat side of the solar redirector always faces directly at the sun. Moreover, the angle of the solar redirector can be adjusted for cleaning and safety reasons. For example, the solar redirector can be folded upward toward the roof of the building so that it can be cleaned easily. In addition, the solar redirector can be configured to fold downward during a storm for safety reasons. One should appreciate that the redirectors can also adjust the output redirection angle to ensure the redirected sunlight is directed to a corresponding optical converter even when the redirectors adjust their coupling angle with respect to the exterior of the building. Further, it is also contemplated that the redirectors can be mounted on neighboring structures other than the building. For example, redirectors can be placed on taller neighboring building to redirect sunlight to the smaller, possibly shadowed, building.

As mentioned, the solar redirector of some embodiments is configured to redirect sunlight to exterior sections of a wall below the solar redirector. Thus, the optical converters of some embodiments are configured to mount on an exterior section of the wall that is below the solar redirector. In some embodiments, the optical converters 215 are configured to receive the redirected sunlight from the solar redirector, and to further redirect the sunlight into the building 105. Different embodiments implement the optical converter differently. For instance, the optical converter of some embodiments is configured to redirect sunlight to different interior space of the building (e.g., a ceiling of a room adjacent to the optical converter). In other embodiments, the optical converter is configured to redirect the sunlight to other light guiding devices (e.g., a set of pipes, mirrors, and/or lens) in order to transport the sunlight to more interior sections of the building. In some of these embodiments, the optical converter is further configured to concentrate and re-collimate the redirected sunlight before directing the sunlight into the light guiding structures of the building.

Figure 3:
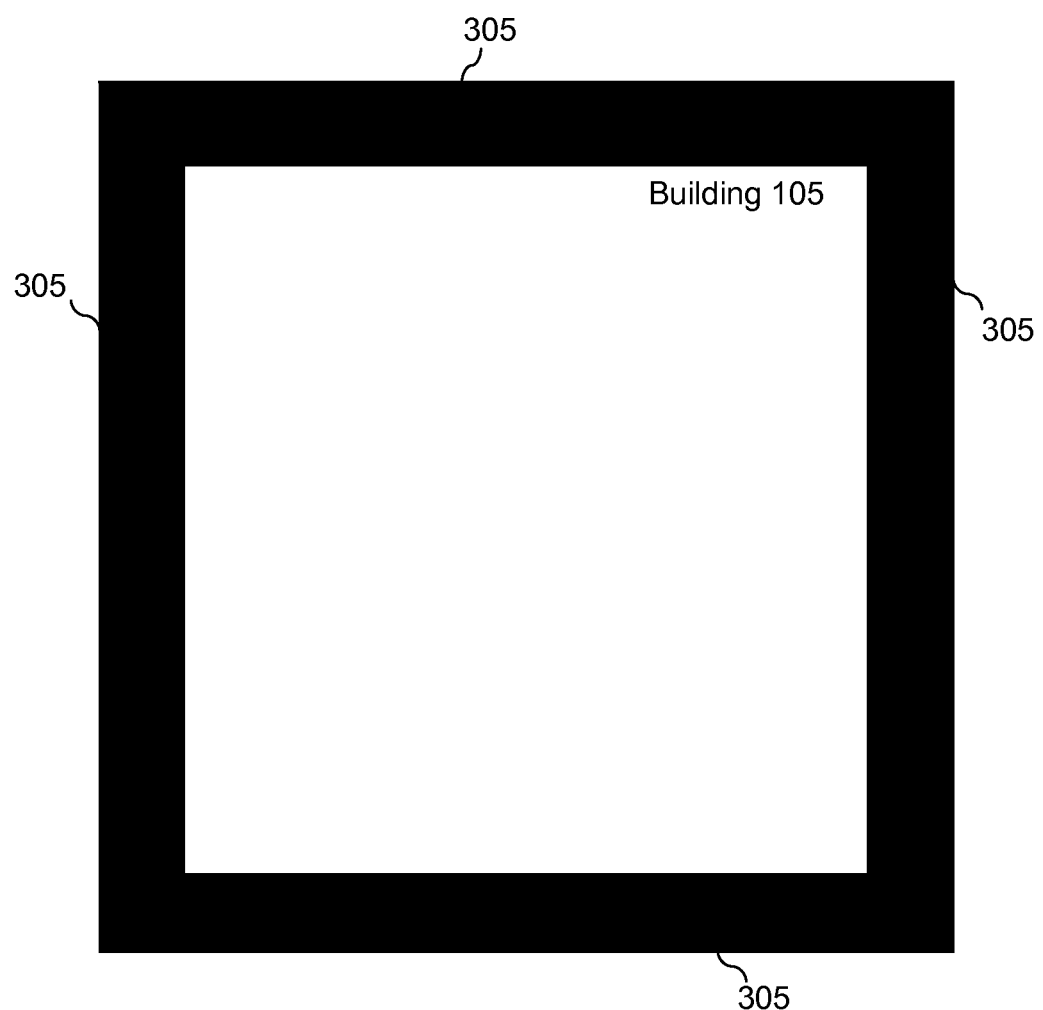
FIG. 3 shows a top view of a building that has installed an illumination system of some embodiments.
Figure 2:
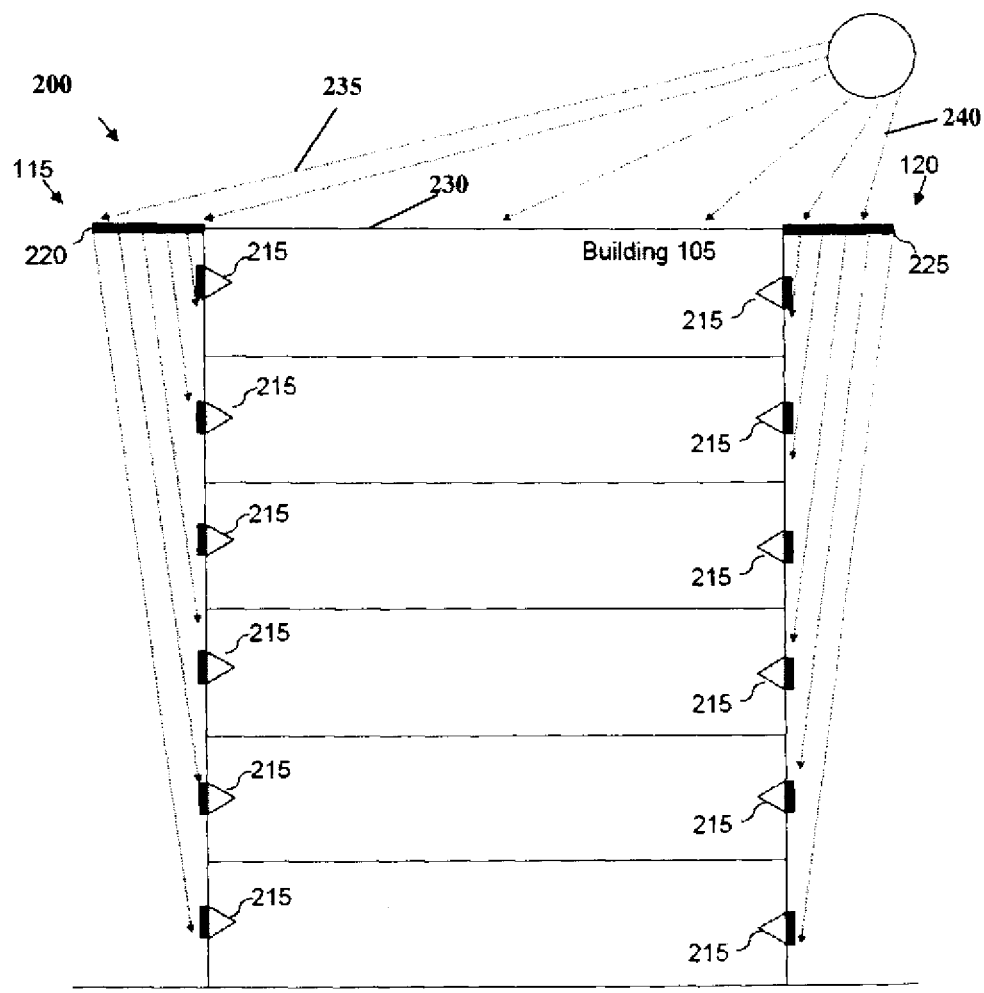

As mentioned, the solar redirectors of some embodiments are configured to be mounted adjacent to the roof of a building. In some embodiments, the illumination system includes several solar redirectors that are mounted on the perimeter of the roof. Preferably but not necessarily, the solar redirectors completes the perimeter of the roof such that the illumination system brings sunlight to all sides of the building. FIG. 3 illustrates a top view of the building 105 on which several solar redirectors 305 are mounted on the perimeter of the roof of the building 105. In addition, the solar redirectors 305 are installed in a way to complete the perimeter of the roof. In this example, the solar redirectors 305 collectively receive sunlight and redirect the sunlight to all sides of the building 105. Thus, it is contemplated that optical converters may be installed on any side of building 105.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

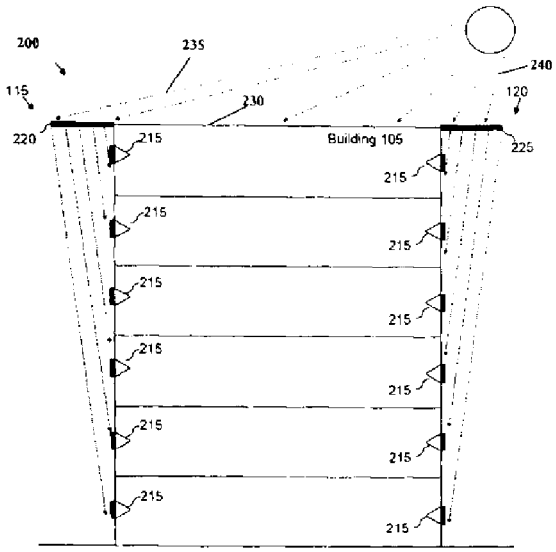

What is claimed is:

1. An illumination system for a building comprising:
a first solar redirector configured to extend outward from a wall of the building and to redirect sunlight at a first angle to at least one exterior section of the wall below the solar redirector; and
a first optical converter configured to mount on the at least one exterior section of the wall below the solar redirector, and to receive the redirected sunlight and distribute the redirected sunlight at a second angle different from the first angle to an interior of the building.

2. The system of claim 1, wherein the solar redirector comprises a canopy.

3. The system of claim 1, wherein the solar redirector is further configured to extend approximately at a right angle to the wall.

4. The system of claim 3, wherein the solar redirector is further configured to adjust its angle with respect to the wall.

5. The system of claim 1, wherein the wall comprises at least one of the followings: an atrium wall, a window, a windowsill, an ornament, and a balcony.

6. The system of claim 1, wherein the redirected sunlight travels through an exterior space adjacent to the wall of the building.

7. The system of claim 6, wherein the exterior space is an optically unobstructed space adjacent to the wall of the building.

8. The system of claim 1, wherein the redirected sunlight travels through an atrium of the building.

9. The system of claim 1, wherein the solar redirector is further configured to concentrate and recollimate the sunlight into a beam of light that is directed to hit the wall at a fixed angle.

10. The system of claim 9, wherein the beam of light is directed to hit the wall at a grazing incidence.

11. The system of claim 10, wherein the beam of light is directed to hit the wall at an angle of incidence that is larger than seventy-five degrees.

12. The system of claim 1, wherein the solar redirector is configured to mount on a perimeter of a roof of the building.

13. The system of claim 1, wherein the solar redirector comprises a rotary venetian assembly.

14. The system of claim 1, wherein the rotary venetian assembly comprises an array of movable light redirecting components.

15. The system of claim 14, wherein the array of movable light redirecting components comprises at least one of a component with light reflecting property and a component with light refracting property.

16. The system of claim 1, wherein the solar redirector has a width that extends outward from the wall, and wherein the solar redirector is further configured to redirect the sunlight to travel a distance that is at least twice the width before hitting the exterior sections of the wall.

17. The system of claim 1 further comprising a plurality of solar redirectors distinct from the first solar redirector, and a plurality of optical converters distinct from the first optical converter.

18. The system of claim 17, wherein the plurality of solar redirectors are configured to mount along a perimeter of a roof of the building.

19. The system of claim 18, wherein the first solar redirector and the plurality of solar redirectors are further configured to complete the perimeter of the roof.

20. The system of claim 18, wherein at least one of the plurality of solar redirectors is further configured to redirect sunlight to a side of the building that does not otherwise receive direct sunlight.

21. The system of claim 1, wherein the optical converter is configured to mount on an exterior section of the wall below the solar redirector and to redirect the redirected sunlight into a light guiding structure.

22. The system of claim 1, wherein the optical converter is further configured to concentrate and re-collimate the redirected sunlight before redirecting the sunlight.

23. The system of claim 22, wherein the redirected sunlight travels through an exterior space adjacent to the wall of the building.

24. The system of claim 22, wherein the optical converter is further configured to redirect the concentrated and re-collimated sunlight into a light guiding structure.

25. An illumination system for a building comprising:
a solar redirector configured to extend outward from at least a portion of a roof perimeter of the building;
an optical converter configured to mount on an exterior section of a wall located below the solar redirector;
wherein the solar redirector is configured to redirect sunlight to at least one exterior section of the wall at a first angle; and
wherein the optical converter is configured to receive the redirected sunlight from the solar redirector, and distribute the redirected sunlight to an interior section of the wall at a second angle different from the first angle.

* * * * *

UNITED STATES PATENT AND TRADEMARK OFFICE
CERTIFICATE OF CORRECTION

Page 1 of 3

PATENT NO.      : 8,611,011 B2
APPLICATION NO. : 13/487679
DATED           : December 17, 2013
INVENTOR(S)     : Lorne Whitehead It is certified that error appears in the above-identified patent and that said Letters Patent is hereby corrected as shown below:

The title page showing the illustrative figure should be deleted to be replaced with the attached title page.

In the Drawings

The drawing sheet, consisting of Fig. 2, should be deleted to be replaced with the drawing sheet, consisting of Fig. 2, as shown on the attached pages.

Signed and Sealed this
Fifth Day of August, 2014

Michelle K. Lee
*Deputy Director of the United States Patent and Trademark Office*

CERTIFICATE OF CORRECTION (continued)

(12) United States Patent
Whitehead

(10) Patent No.: US 8,611,011 B2
(45) Date of Patent: Dec. 17, 2013

(54) DUAL-STAGE SUNLIGHT REDIRECTION SYSTEM

(75) Inventor: Lorne Whitehead, Vancouver (CA)

(73) Assignee: SunCentral, Inc. (CA)

(*) Notice: Subject to any disclaimer, the term of this patent is extended or adjusted under 35 U.S.C. 154(b) by 0 days.

(21) Appl. No.: 13/487,679

(22) Filed: Jun. 4, 2012

(65) Prior Publication Data
US 2013/0279008 A1 Oct. 24, 2013

Related U.S. Application Data

(60) Provisional application No. 61/636,422, filed on Apr. 20, 2012.

(51) Int. Cl.
G02B 5/08 (2006.01)
E06B 7/28 (2006.01)
F21V 7/00 (2006.01)

(52) U.S. Cl.
USPC ............ 359/591; 52/173.1; 52/200; 359/597

(58) Field of Classification Search
USPC .............................. 52/200; 359/591–598
See application file for complete search history.

(56) References Cited

U.S. PATENT DOCUMENTS

| | | | |
|---|---|---|---|
| 717,783 A | 1/1903 | Wadsworth | |
| 729,660 A | 6/1903 | Poulson | |
| 1,567,984 A * | 12/1925 | Reid | 359/597 |
| 2,022,144 A * | 11/1935 | Nicolson | 353/3 |
| 5,295,051 A * | 3/1994 | Cowling | 362/576 |
| 5,980,052 A * | 11/1999 | Thor et al. | 359/877 |
| 8,027,092 B1 * | 9/2011 | Huff et al. | 359/591 |
| 8,491,138 B2 * | 7/2013 | O | 359/855 |
| 2005/0128728 A1 | 6/2005 | Lisenman et al. | |
| 2006/0013001 A1* | 1/2006 | Roth | 362/296 |

(Continued)

FOREIGN PATENT DOCUMENTS

| WO | 2011/012301 | 2/2011 |
| WO | 2012/051095 | 4/2012 |
| WO | 2013/059908 | 5/2013 |
| WO | 2013/093796 | 6/2013 |

OTHER PUBLICATIONS

Entech Solar, "Entech Collimating Skylight—Economical daylighting technology that double the amount of light where you want it", Entech Solar, Inc., 2011.

(Continued)

*Primary Examiner* — Clayton E Laballe
*Assistant Examiner* — Kevin Butler
(74) *Attorney, Agent, or Firm* — Fish & Associates, PC

(57) ABSTRACT

A system providing consistent and intense sunlight to light-guiding structures for redirecting sunlight to the interior of a building is presented. One aspect of the inventive subject matter includes an illumination system comprising a solar redirector and at least one optical converter. The solar redirector can be configured to extend outward from a wall of a building and to redirect sunlight to exterior sections of the wall below the solar redirector. The optical converter can be configured to mount on at least one of the exterior sections of the wall and to receive the redirected sunlight and distribute the redirected sunlight to an interior of the building.

25 Claims, 3 Drawing Sheets